United States Patent
Huang et al.

(10) Patent No.: US 8,674,980 B2
(45) Date of Patent: Mar. 18, 2014

(54) THREE-DIMENSIONAL IMAGE INTERACTIVE SYSTEM AND POSITION-BIAS COMPENSATION METHOD OF THE SAME

(75) Inventors: Pin-Chou Huang, Hsin-Chu (TW);
Wen-Hung Liao, Hsin-Chu (TW);
Kai-Chieh Chang, Hsin-Chu (TW);
Chia-Yang Lee, Hsin-Chu (TW);
Wen-Pin Chen, Hsin-Chu (TW);
Meng-Ying Hsieh, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 210 days.

(21) Appl. No.: 13/156,803

(22) Filed: Jun. 9, 2011

(65) Prior Publication Data
US 2012/0105438 A1    May 3, 2012

(30) Foreign Application Priority Data

Oct. 29, 2010    (TW) ................................ 99137370 A

(51) Int. Cl.
*G06T 15/04*    (2011.01)
(52) U.S. Cl.
USPC ............................. 345/419; 345/427; 345/594
(58) Field of Classification Search
USPC ........................................................ 345/419
See application file for complete search history.

(56) References Cited

U.S. PATENT DOCUMENTS

| 5,913,727 | A | 6/1999 | Ahdoot et al. |
| 7,508,392 | B2 * | 3/2009 | Barfuss et al. ................ 345/428 |
| 2007/0021207 | A1 | 1/2007 | Ahdoot |
| 2011/0187638 | A1 * | 8/2011 | Chao ............................ 345/156 |
| 2011/0254918 | A1 | 10/2011 | Chou et al. |

FOREIGN PATENT DOCUMENTS

| TW | 538382 | 6/2003 |
| TW | I246586 | 1/2006 |
| TW | 200822059 | 5/2008 |
| TW | 200910146 | 3/2009 |
| TW | 200746791 | 7/2009 |
| TW | 201003564 | 1/2010 |
| TW | 201031179 | 8/2010 |

OTHER PUBLICATIONS

Taiwan Patent Office, "Office Action", Jul. 30, 2013.

* cited by examiner

*Primary Examiner* — Javid A Amini
*Assistant Examiner* — Kwang Lee
(74) *Attorney, Agent, or Firm* — WPAT, PC; Justin King

(57) ABSTRACT

A position-bias compensation method, applied to a three-dimensional image interactive system, includes steps of: displaying a three-dimensional image and setting a trigger position in a preset interactive coordinate system according to a default position of a user; obtaining a position-bias of a user's position from the default position; and resetting the trigger position according to the position-bias.

15 Claims, 5 Drawing Sheets

THREE-DIMENSIONAL IMAGE INTERACTIVE SYSTEM AND POSITION-BIAS COMPENSATION METHOD OF THE SAME

TECHNICAL FIELD

The disclosure relates to a three-dimensional (3D) image interactive system and a position-bias compensation method, and more particularly to a 3D image interactive system and a position-bias compensation method capable of modulating a trigger position according to a bias of a user position to a default position.

BACKGROUND

FIG. 1 is a schematic diagram illustrating a user interacting with a conventional 3D image interactive system. As depicted in FIG. 1, a real user 15 interacts with a conventional 3D image interactive system (such as a 3D video game system) 10. The 3D image interactive system 10 mainly includes a display-and-interactive device 12 configured for generating a 3D image. In the 3D display technology, it is understood that the real user 15 has to wear a 3D glasses (not shown) to watch the 3D image displayed by the display-and-interactive device 12.

As depicted in FIG. 1, the real user 15 can only interact with the 3D image interactive system 10 via a virtual user 14 which is generated by the display-and-interactive device 12. In other words, the real user 15 does not directly interact with the 3D image interactive system 10, instead, the real user 15 interacts with the 3D image interactive system 10 via a virtual user 14, which is controlled by a remote controller (or other positioning device) 16 hold by the real user 15. Because the real user 15 does not directly interact with the 3D image interactive system 10, the real user 15 may not feel so real.

To make a user have a better immersive experience, most of the modern 3D image interactive systems are equipped with a detecting device which is for detecting a user's action, and the modern 3D image interactive systems can immediately perform a response action in response to the user's action, so that a direct interaction between the user and the 3D image interactive systems is realized. FIG. 2 is a schematic diagram illustrating a user interacting with a modern 3D image interactive system. As depicted in FIG. 2, the modern 3D image interactive system 20 mainly includes a display-and-interactive device 22 and a detecting device 24; wherein the detecting device 24 is coupled via signal to the display-and-interactive device 22. Additionally, most of the modern 3D image interactive systems have a predefined default position, and a good interaction can be achieved when the user is always at the default position to interact with the 3D image interactive systems. Please refer to FIG. 2, the default position of the 3D image interactive system 20 is set at $P(X_0, Y_0, Z_0)$ in an interactive coordinate system 26 which is defined in front of the display-and-interactive device 22; wherein $Z_0$ is the distance between the default position $P(X_0, Y_0, Z_0)$ and the display-and-interactive device 22. When the user is positioned at the default position $P(X_0, Y_0, Z_0)$ and interacts with the 3D image interactive system 20, the detecting device 24 keeps detecting the user's action and the 3D image interactive system 20 performs a response action based on the user's action at the default position $P(X_0, Y_0, Z_0)$, so that the direct interaction of the user to the 3D image interactive system 20 is realized.

In the 3D display technology, it is understood that even though the user is not at the default position, the user can still observe an almost same 3D image. For example, please refer to FIG. 2, whether the user is positioned at $P(X_0, Y_0, Z_0)$ or $Q(X_1, Y_1, Z_1)$, he or she can observe at a same specific time a 3D image generated by the 3D image interactive system 20, except that the 3D image observed at $Q(X_1, Y_1, Z_1)$ may have a shear distortion comparing with the 3D image observed at $P(X_0, Y_0, Z_0)$. However, when the user is positioned at $Q(X_1, Y_1, Z_1)$ to interact with the 3D image interactive system 20, the 3D image interactive system 20 would not work normally, because the 3D image interactive system 20 can produce a response action only based on the user's action at the default position $P(X_0, Y_0, Z_0)$.

SUMMARY OF THE INVENTION

Therefore, the object of the present invention is to provide a three-dimensional image interactive system and a position-bias compensation method capable of modulating a trigger position according to a position-bias of a user's position from the default position.

The present invention provides a position-bias compensation method, applied to a three-dimensional image interactive system, comprising steps of: displaying a three-dimensional image and setting a trigger position in a preset interactive coordinate system according to a default position of a user; obtaining a position-bias of a user's position from the default position; and resetting the trigger position according to the position-bias.

In one embodiment, the above-mentioned resetting the trigger position comprises a step of: resetting the trigger position through modulating the trigger position in the preset interactive coordinate system.

In one embodiment, the above-mentioned resetting the trigger position comprises a step of: resetting the trigger position through resetting the preset three-dimensional image coordinate.

In one embodiment, the above-mentioned three-dimensional image is composed by a first image and a second image which has an aberration to the first image, and is visible by the user wearing three-dimensional glasses.

In one embodiment, the position-bias compensation method further comprises a step of: triggering the three-dimensional image interactive system to perform a response action in response to a user's action moving an object to pass through the reset trigger position in the preset interactive coordinate system.

In one embodiment, the above mentioned response action is implemented by sound feedback, tactile feedback, visual feedback, or a command input.

In one embodiment, the above mentioned step of resetting the trigger position comprises steps of: determining a direction from the trigger position to the reset trigger position in the interactive coordinate system according to a direction of the position-bias; and determining a distance from the trigger position to the reset trigger position in the interactive coordinate system according to the value of the position-bias.

In one embodiment, the position-bias compensation method further comprises a step of: resetting the preset three-dimensional image coordinate according to the position-bias, wherein the reset three-dimensional image coordinate is configured for displaying the three-dimensional image.

In one embodiment, the above mentioned step of resetting the three-dimensional image coordinate further comprises steps of: determining a direction from the preset three-dimensional image coordinate to the reset three-dimensional image coordinate according to a direction of the position-bias; and determining a distance from the preset three-dimensional image coordinate to the reset three-dimensional image coordinate according to the value of the position-bias.

The present invention also provides a three-dimensional image interactive system, for interacting with a user, comprising: a display-and-interactive device, configured for displaying a three-dimensional image and setting a trigger position in a preset interactive coordinate system according to a default position of the user; a detecting device, configured for detecting a position-bias of the user's position to the default position; and a compensation unit, coupled by signal to the detecting device and the display-and-interactive device, and configured for receiving the position-bias and resetting the trigger position in the preset interactive coordinate system according to the position-bias.

In one embodiment, the above mentioned three-dimensional image is composed by a first image and a second image which has an aberration to the first image, and is visible by the user wearing three-dimensional glasses.

In one embodiment, the above mentioned three-dimensional image interactive system performs a response action in response to a user's action moving an object to pass through the reset trigger position in the preset interactive coordinate system.

The present invention also provides a position-bias compensation device, applied to a three-dimensional image interactive system for displaying a three-dimensional image and setting a trigger position in a preset interactive coordinate system according to a default position, comprising: a detecting device, configured for detecting a position-bias of the user's position to the default position; and a compensation unit, coupled by signal to the detecting device and the display-and-interactive device, and configured for receiving the position-bias and resetting the trigger position in the preset interactive coordinate system according to the position-bias.

In one embodiment, the above mentioned three-dimensional image is composed by a first image and a second image which has an aberration to the first image, and is visible by the user wearing three-dimensional glasses.

In one embodiment, the above mentioned compensation unit resets a three-dimensional image coordinate according to the bias, and the three-dimensional image coordinate is configured for displaying the three-dimensional image.

Because the three-dimensional image interactive system of the present invention firstly detects the actual position of the user and then compensates the trigger position based on the bias of the detected user position to the default position, the three-dimensional image interactive system of the present invention can perform a correct response action according to the user's action at the compensated trigger position.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

To get a more clear understanding of the present invention, a specific scene for explaining the present invention is introduced here. In the specific scene, a 3D image interactive system of the present invention is designed to shoot a virtual-image ball toward to a user, and the 3D image interactive system accordingly performs a response action (such as displaying the virtual-image ball returning from the user) if the 3D image interactive system of the present invention detects that the user successfully strikes back the virtual-image ball.

Figure 1:
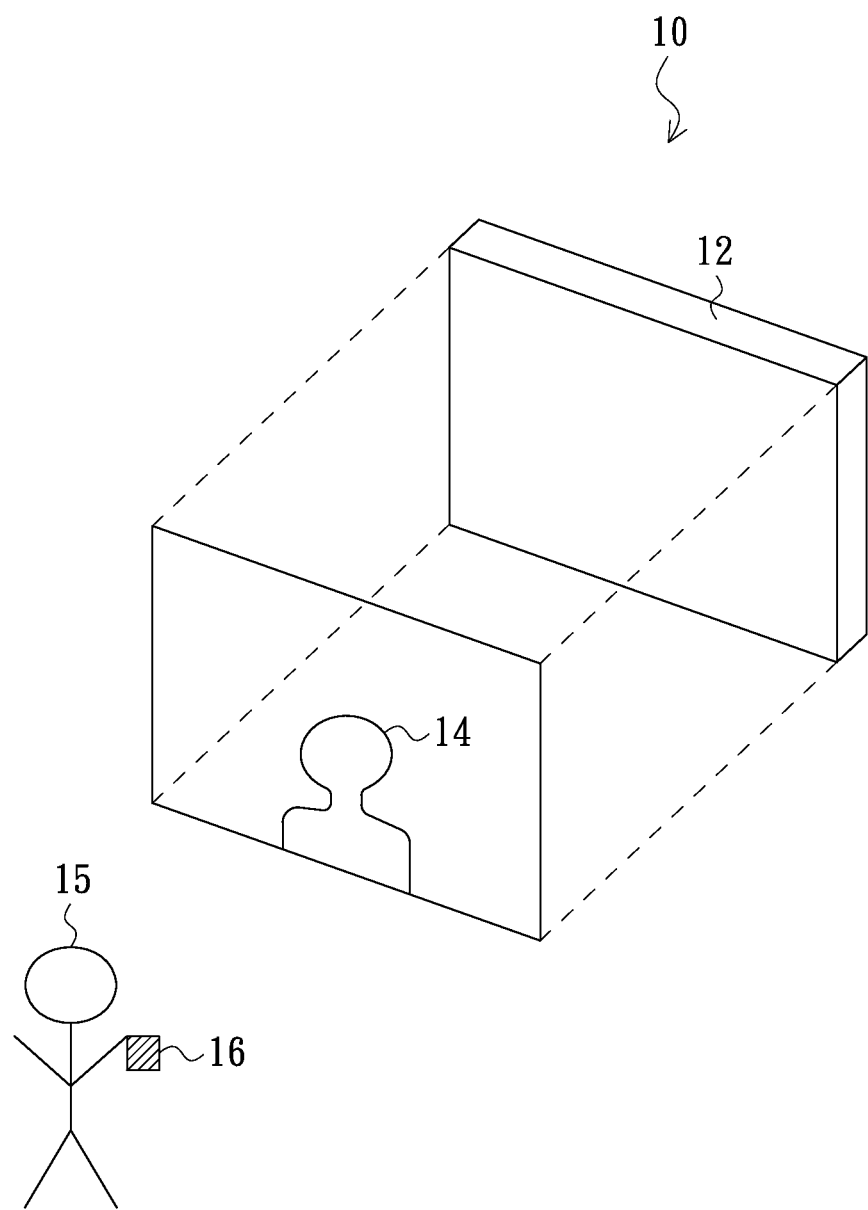
FIG. 1 is a schematic diagram illustrating a user interacting with a conventional 3D image interactive system.
Figure 2:
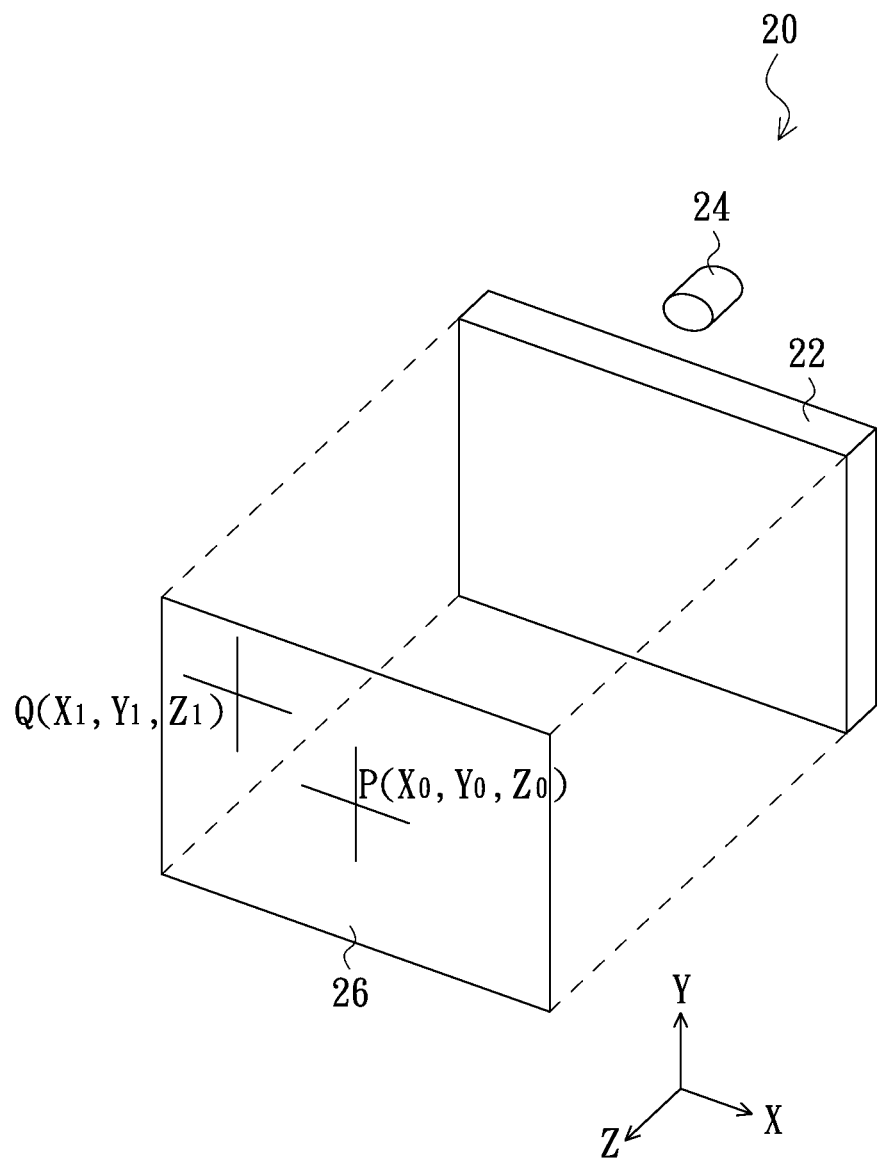
FIG. 2 is a schematic diagram illustrating a user interacting with a modern 3D image interactive system.
Figure 3:
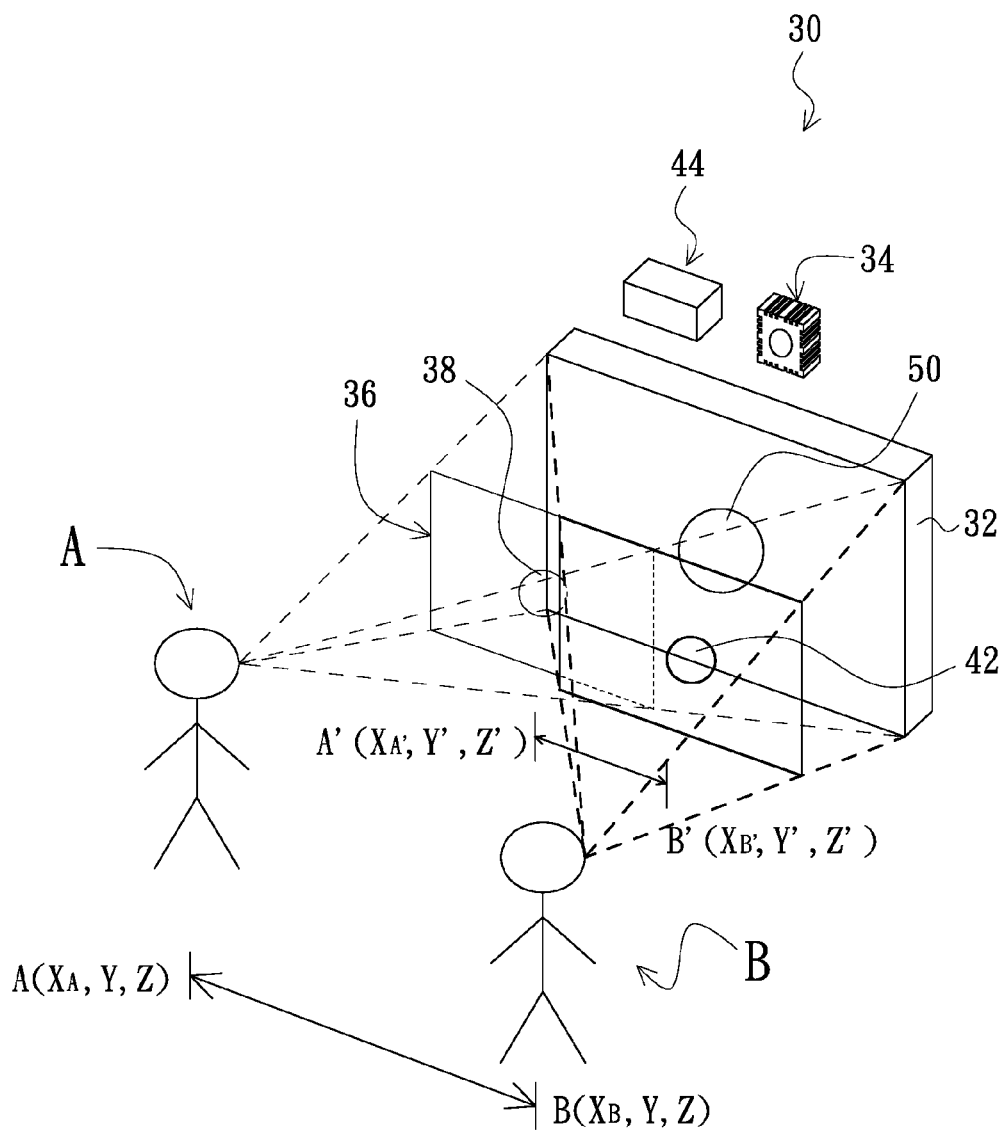
FIG. 3 is a schematic diagram illustrating a user interacting with the 3D image interactive system of the present invention.

FIG. 3 is a schematic diagram illustrating a user interacting with the 3D image interactive system of the present invention. As depicted in FIG. 3, the 3D image interactive system 30 of the present invention mainly includes a display-and-interactive device 32, a detecting device 34, and a compensation unit 44; wherein the compensation unit 44 is coupled via signal to the display-and-interactive device 32 and the detecting device 34. The display-and-interactive device 32 is configured for generating a 3D image. The detecting device 34 is configured for detecting the user's position. In the specific scene as mentioned above, a virtual-image ball 38, which is shot toward to a user, is created by a real-image ball 50 which is generated by the display-and-interactive device 32. Specifically, the virtual-image ball 38 is created by two images with aberration (not shown) of the real-image ball 50 displayed on the display-and-interactive device 32.

During the user interacts with the 3D image interactive system 30 in the specific scene as mentioned above, the virtual-image ball 38 is shot toward him in a vector direction determined by the virtual ball 38 and the real-image ball 50. In an interactive coordinate system 36, the user A is assumed to be at A($X_A$, Y, Z). In the embodiment, the position A($X_A$, Y, Z) is the default position of the 3D image interactive system 30. When the virtual-image ball 38 is at A'($X_{A'}$, Y', Z') in the interactive coordinate system 36 at a specific time T1, the user A waves his racket (or sensor, not shown) toward the virtual-image ball 38, to strike back the virtual-image ball 38. For the 3D image interactive system 30, when a hand or the racket (or sensor) in a hand of the user is detected to be at a trigger position, for example, the position A'($X_{A'}$, Y', Z'), by the detecting device 34 at the time T1, the 3D image interactive system 30 then determines that the user successfully strikes back the virtual-image ball 38 at the time T1, so that the 3D image interactive system 30 performs a response action, for example, by means of displaying that the virtual-image ball 38 returns from the user A to the display-and-interactive device 32.

As mentioned above, in the 3D display technology, two users located at two different positions in the interactive coordinate system 36 can observe an almost same 3D image. Please refer to FIG. 3, if a user (i.e., user B) is at a position B($X_B$, Y, Z), not at the default position A($X_A$, Y, Z), to interact with the 3D image interactive system 30, the original trigger position A'($X_A$, Y', Z') which corresponds to the default position A($X_A$, Y, Z) is compensated by the compensation unit 44 to a position B'($X_B$, Y', Z') which corresponds to the position B($X_B$, Y, Z) of the real user in the 3D image interactive system 30, according to the position-bias from the default position A($X_A$, Y, Z) to the actual position B($X_B$, Y, Z) detected by the detecting device 34; wherein B'($X_B$, Y', Z') is the position of a virtual-image ball 42 which is observed by the user B at the specific time T1. Because the trigger position in the specific scene is compensated from A'($X_A$, Y', Z') to B'($X_B$, Y', Z') according to the actual position-bias of the user from position A($X_A$, Y, Z) to B($X_B$, Y, Z), the problems occurred in the conventional 3D image interactive system, such as the user B strikes back the virtual-image ball 42 but the response action performed by the interacting with the 3D image interactive system 30 is based on user's action at the default position A($X_A$, Y, Z), can be avoided.

Figure 4:
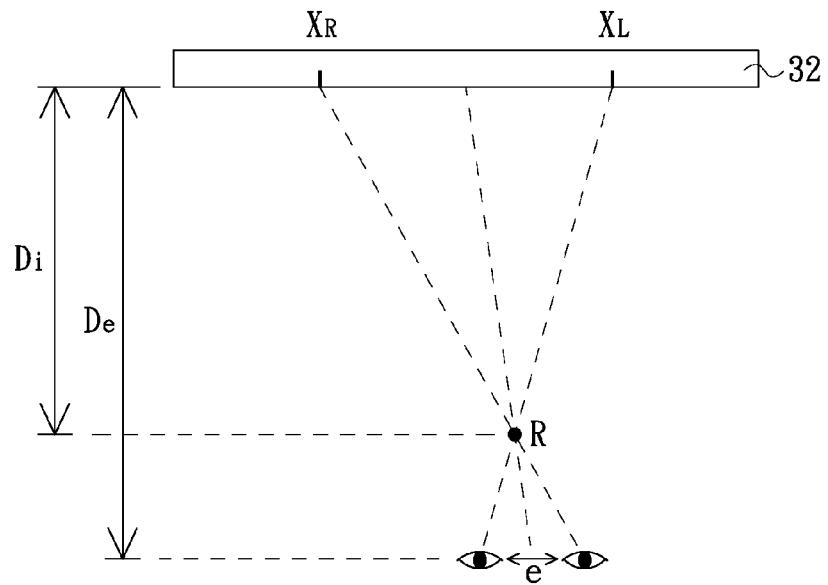
FIG. 4 is a schematic diagram illustrating an imaging process of the 3D display technology to form a 3D image.

FIG. 4 is a schematic diagram illustrating an imaging process of the 3D display technology to form a 3D image. As depicted in FIG. 4, a virtual image R (a 3D image) is created by two real images which are a left image at a position $X_L$ on the display-and-interactive device 32 and a right image at a position $X_R$ on the display-and-interactive device 32. Here, a distance $D_i$ from the position of the virtual image R observed by two eyes of a user to the display-and interactive device 32, is obtained by the following equations:

$$\frac{D_i}{D_e - D_i} = \frac{X_L - X_R}{e} \quad (1)$$

$$D_i = \frac{(X_L - X_R) \times D_e}{e + (X_L - X_R)} \quad (2)$$

wherein a distance between the two eyes to the display-and-interactive device 32 is $D_e$; a distance between the two eyes is e.

Figure 5:
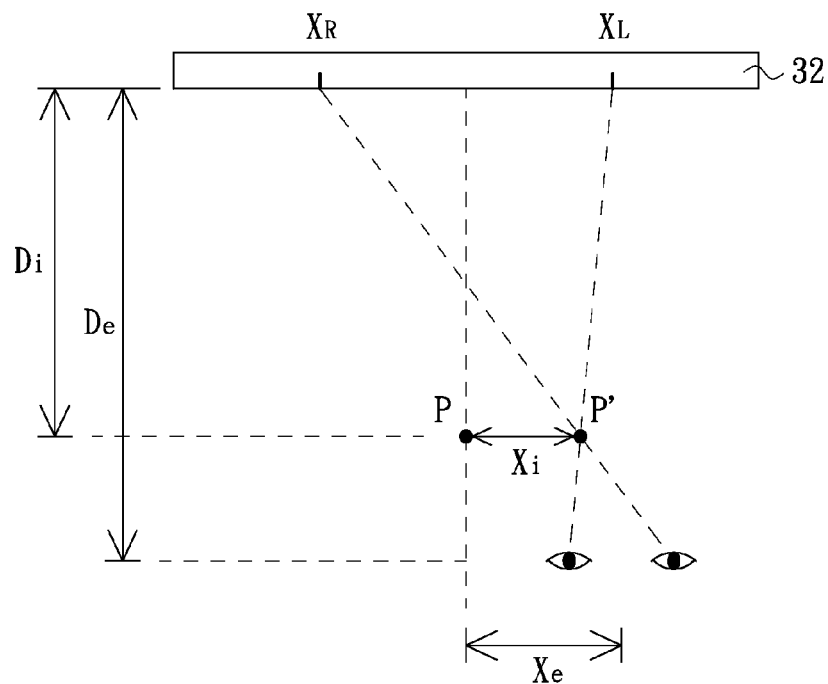
FIG. 5 is a schematic diagram illustrating the compensation process for the trigger position on x-axis in the 3D image interactive system of the present invention.

The equations (1) and (2), for determining the distance between the virtual image R and the display-and-interactive device 32, are introduced in the 3D image interactive system 30 of the present invention for compensating the trigger position. FIG. 5 is a schematic diagram illustrating the compensation process for the trigger position on x-axis in the 3D image interactive system 30 of the present invention. As depicted in FIG. 5, it is assumed that two eyes of a user are originally symmetrically positioned at opposite sides of the perpendicular bisector of a line segment determined by position $X_L$ and position $X_R$ on the display-and-interactive device 32, and the distance of the two eyes to the display-and-interactive device 32 is $D_e$; the distance $D_i$ of the virtual image R (or the original trigger position P) to the display-and-interactive device 32 can thus be obtained by equations (1) and (2) as mentioned above. When the two eyes are moved for a distance of $X_e$ from the original positions, the position-bias $X_i$ on x-axis of the new trigger position P' from the original trigger position P is obtained by the following equations:

$$\frac{X_i}{X_e} = \frac{D_i}{D_e} \quad (3)$$

$$X_i = \frac{D_i \times X_e}{D_e} = \frac{(X_L - X_R) \times X_e}{e + (X_L - X_R)} \quad (4)$$

In other words, in the 3D image system 30 as shown in FIG. 3, once the position-bias of the actual position of user (i.e., position B) from the default position (position A) is detected by the detecting device 34 and then transmitted to the compensation unit 44, the position-bias $X_i$ on x-axis of the new trigger position from the original trigger position is accordingly obtained by the compensation unit 44 based on the equations (3) and (4). It is understood that a position-bias $Y_i$ on y-axis of a new trigger position P' from the original trigger position P can be also obtained by the compensation unit 44 based on the equations (3) and (4), the detailed description of how to obtain the position-bias $X_i$ can be referenced here.

Figure 6:
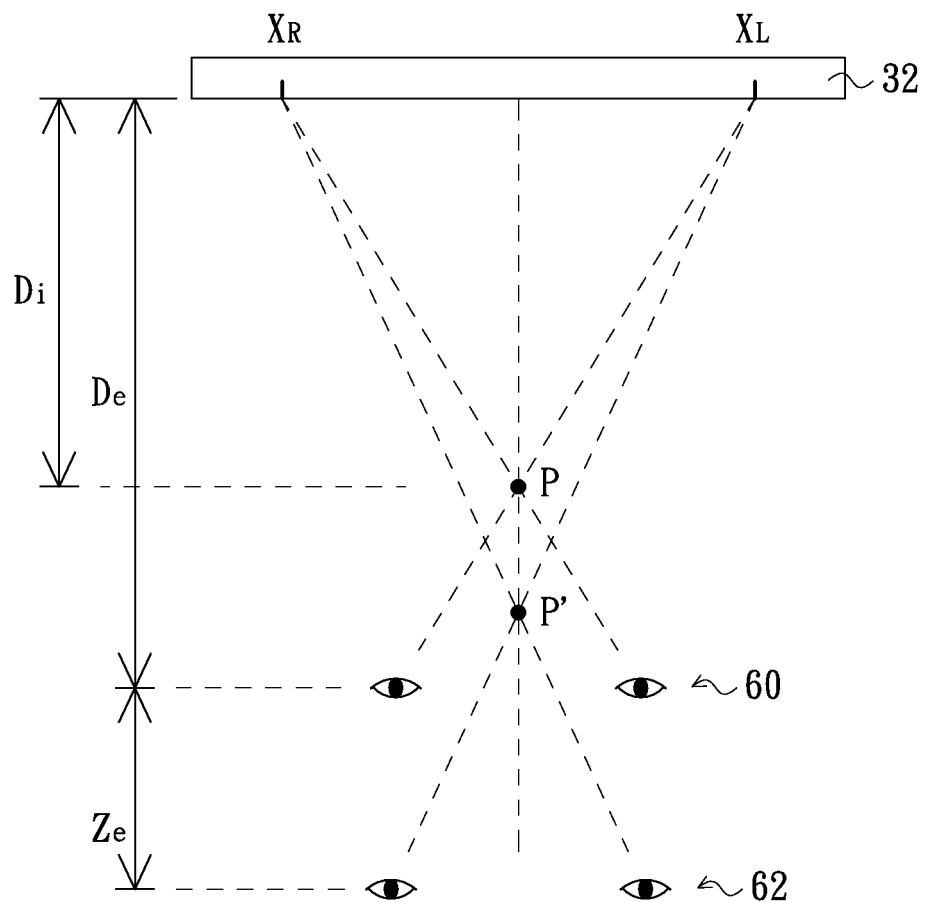
FIG. 6 is a schematic diagram illustrating the compensation process for the trigger position on z-axis in the 3D image interactive system of the present invention.

FIG. 6 is a schematic diagram illustrating the compensation process for the trigger position on z-axis in the 3D image interactive system 30 of the present invention. As depicted in FIG. 6, two eyes of user are originally located at first positions 60 which are at opposite sides of the perpendicular bisector of a line segment determined by position $X_L$ and position $X_R$ on the display-and-interactive device 32, and the distance of the two eyes to the display-and-interactive device 32 is $D_e$; the distance $D_i$ of the virtual image R (or the original trigger position P) to the display-and-interactive device 32 can thus be obtained by equations (1) and (2) as mentioned above. When the two eyes are moved for a distance of $Z_e$ from the first positions 60 to second positions 62 which are still at opposite sides of the perpendicular bisector of a line segment determined by position $X_L$ and position $X_R$ on the display-and-interactive device 32, the position-bias $Z_i$ on z-axis of the new trigger position P' from the original trigger position P is obtained by equations:

$$D_i = \frac{(X_L - X_R) \times D_e}{e + (X_L - X_R)} \quad (5)$$

$$Z_i = \frac{(X_L - X_R) \times Z_e}{e + (X_L - X_R)} \quad (6)$$

In other words, in the 3D image system 30 as shown in FIG. 3, once the position-bias of the actual position of user from the default position is detected by the detecting device 34 and then transmitted to the compensation operation 44, the position-bias $Z_i$ on z-axis of the new trigger position from the original trigger position is accordingly obtained by the compensation unit 44 based on the equations (5) and (6).

Summarily, the 3D image interactive system 30 of the present invention firstly detects the actual position of the user, and then compensates the trigger position based on the position-bias of the detected user position from the default position, so as to perform a response action according to the user's action at the compensated trigger position. In the 3D image interactive system 30 of the present invention, the direction from the original trigger position to the new trigger position is determined according to the direction of the position-bias from the actual position of user to the default position; and the distance from the original trigger position to the new trigger position is determined according to the value of the position-bias between the actual position of user and the default position.

Moreover, it is understood that the invention is not limited to the exemplary specific scene of the 3D image interactive system 30 to perform the response action by returning the virtual image ball to the display-and-interactive device 32 from the user when the user successfully strikes back the virtual image ball. The response action performed by the 3D image interactive system 30 can be implemented by sound feedback (e.g., a sound is produced when the racket strikes back the virtual-image ball), tactile feedback (e.g., shake of the racket can be felt by the user when the racket strikes back the virtual-image ball), visual feedback (e.g., an image of the virtual-image ball returning from the user to the display-and-interactive device or the amount of the stroked virtual-image ball is displayed on the display-and interactive device 32), or a command input (e.g., the user can select the pitch of the return ball).

In other embodiments, after the position-bias $(X_i, Y_i, Z_i)$ of the actual user's position to the default position is detected by the 3D image interactive system 30, a 3D image coordinate for displaying the 3D images can be accordingly modulated based on the detected position-bias, so that the user has a better observation to the 3D images on the display-and-interactive device 32, though he is not at the default position.

Because the trigger position and the 3D image coordinate are compensated according to the position-bias of the actual user's position from the default position in the 3D image interactive system 30, the interaction between the user and the 3D image interactive system 30 is very accurate and real. For example, if the 3D image interactive system 30 is a 3D video game system, a player can accurately identify the locations of bullets shooting to himself; or a stereo sound is played while a user accurately interacts with the 3D image interactive system 30; or a physical response action, such as a microcurrent, atmospheric pressure, or ultrasound etc., may be performed to a user by the 3D image interactive system 30 while the user accurately interacts with a 3D image.

Moreover, the detection of the actual user's position performed by the detecting device 34 can be done through an IR device or an optical sensing device (e.g., CCD or CMOS). The detection realized by the IR device is commonly defined as the active method, and the detection realized by the optical sensing device (e.g., CCD or CMOS) is commonly defined as the passive method. In the active method, the actual position of the user is obtained by infrared distance measurement. In the passive method, the actual position of the user is obtained via analyzing multiple 2D images which are captured by the optical sensing device (e.g., CCD or CMOS) and rebuilding a 3D coordinate.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A position-bias compensation method, applied to a three-dimensional image interactive system having a display-and-interactive device, comprising steps of:
   displaying a three-dimensional image and setting a trigger position in a preset interactive coordinate system according to a default position of a user by the display-and-interactive device;
   obtaining a position-bias of a user's position from the default position; and
   resetting the trigger position according to the position-bias of the user's position by equations:

$$D_i = \frac{(X_L - X_R) \times D_e}{e + (X_L - X_R)}$$

$$X_i = \frac{D_i \times X_e}{D_e} = \frac{(X_L - X_R) \times X_e}{e + (X_L - X_R)}$$

$$Z_i = \frac{(X_L - X_R) \times Z_e}{e + (X_L - X_R)}$$

wherein $X_L$ is a position of a first image of the three-dimensional image displayed on the display-and-interactive device, $X_R$ is a position of a second image of the three-dimensional image displayed on the display-and-interactive device, $D_e$ is a distance between the user and the display-and-interactive device, $D_i$ is a distance between the display-and-interactive device and a virtual image of the three-dimensional image observed by the user, e is a distance between two eyes of the user, $X_e$ is the position-bias of the user's position on a first direction parallel to the display-and-interactive device, $X_i$ is a position-bias of the reset trigger position on the first direction, $Z_e$ is the position-bias of the user's position on a second direction perpendicular to the display-and-interactive device, and $Z_i$ is the position-bias of the reset trigger position on the second direction.

2. The position-bias compensation method according to claim 1, wherein resetting the trigger position comprises a step of:
   resetting the trigger position through modulating the trigger position in the preset interactive coordinate system.

3. The position-bias compensation method according to claim 1, wherein resetting the trigger position comprises a step of:
   resetting the trigger position through resetting the preset three-dimensional image coordinate.

4. The position-bias compensation method according to claim 1, wherein the three-dimensional image is composed by the first image and the second image which has an aberration to the first image, and is visible by the user wearing three-dimensional glasses.

5. The position-bias compensation method according to claim 1, further comprising a step of:
   triggering the three-dimensional image interactive system to perform a response action in response to a user's action moving an object to pass through the reset trigger position in the preset interactive coordinate system.

6. The position-bias compensation method according to claim 5, wherein the response action is implemented by sound feedback, tactile feedback, visual feedback, or a command input.

7. The position-bias compensation method according to claim 1, wherein resetting the trigger position comprises steps of:
   determining a direction from the trigger position to the reset trigger position in the interactive coordinate system according to a direction of the position-bias; and
   determining a distance from the trigger position to the reset trigger position in the interactive coordinate system according to the value of the position-bias.

8. The position-bias compensation method according to claim 3, further comprising a step of:
   resetting the preset three-dimensional image coordinate according to the position-bias, wherein the reset three-dimensional image coordinate is configured for displaying the three-dimensional image.

9. The position-bias compensation method according to claim 8, wherein resetting the preset three-dimensional image coordinate comprises steps of:
   determining a direction from the preset three-dimensional image coordinate to the reset three-dimensional image coordinate according to a direction of the position-bias; and
   determining a distance from the preset three-dimensional image coordinate to the reset three-dimensional image coordinate according to the value of the position-bias.

10. A three-dimensional image interactive system, for interacting with a user, comprising:
   a display-and-interactive device, configured for displaying a three-dimensional image and setting a trigger position in a preset interactive coordinate system according to a default position of the user;
   a detecting device, configured for detecting a position-bias of the user's position to the default position; and
   a compensation unit, coupled by signal to the detecting device and the display-and-interactive device, and configured for receiving the position-bias and resetting the trigger position in the preset interactive coordinate system according to the position-bias of the user's position by equations:

$$D_i = \frac{(X_L - X_R) \times D_e}{e + (X_L - X_R)}$$

$$X_i = \frac{D_i \times X_e}{D_e} = \frac{(X_L - X_R) \times X_e}{e + (X_L - X_R)}$$

$$Z_i = \frac{(X_L - X_R) \times Z_e}{e + (X_L - X_R)}$$

wherein $X_L$ is a position of a first image of the three-dimensional image displayed on the display-and-interactive device,
$X_R$ is a position of a second image of the three-dimensional image displayed on the display-and-interactive device,
$D_e$ is a distance between the user and the display-and-interactive device,
$D_i$ is a distance between the display-and-interactive device and a virtual image of the three-dimensional image observed by the user,
e is a distance between two eyes of the user,
$X_e$ is the position-bias of the user's position on a first direction parallel to the display-and-interactive device,
$X_i$ is a position-bias of the reset trigger position on the first direction,
$Z_e$ is the position-bias of the user's position on a second direction perpendicular to the display-and-interactive device, and
$Z_i$ is the position-bias of the reset trigger position on the second direction.

11. The three-dimensional image interactive system according to claim 10, wherein the three-dimensional image is composed by the first image and the second image which has an aberration to the first image, and is visible by the user wearing three-dimensional glasses.

12. The three-dimensional image interactive system according to claim 10, wherein the three-dimensional image interactive system performs a response action in response to a user's action moving an object to pass through the reset trigger position in the preset interactive coordinate system.

13. A position-bias compensation device, applied to a three-dimensional image interactive system for displaying a three-dimensional image and setting a trigger position in a preset interactive coordinate system according to a default position, comprising:
   a detecting device, configured for detecting a position-bias of the user's position to the default position; and
   a compensation unit, coupled by signal to the detecting device and a display-and-interactive device, and configured for receiving the position-bias and resetting the trigger position in the preset interactive coordinate system according to the position-bias of the user's position by equations:

$$D_i = \frac{(X_L - X_R) \times D_e}{e + (X_L - X_R)}$$

$$X_i = \frac{D_i \times X_e}{D_e} = \frac{(X_L - X_R) \times X_e}{e + (X_L - X_R)}$$

$$Z_i = \frac{(X_L - X_R) \times Z_e}{e + (X_L - X_R)}$$

wherein $X_L$ is a position of a first image of the three-dimensional image displayed on the display-and-interactive device,
$X_R$ is a position of a second image of the three-dimensional image displayed on the display-and-interactive device,
$D_e$ is a distance between the user and the display-and-interactive device,
$D_i$ is a distance between the display-and-interactive device and a virtual image of the three-dimensional image observed by the user,
e is a distance between two eyes of the user,
$X_e$ is the position-bias of the user's position on a first direction parallel to the display-and-interactive device,
$X_i$ is a position-bias of the reset trigger position on the first direction,
$Z_e$ is the position-bias of the user's position on a second direction perpendicular to the display-and-interactive device, and
$Z_i$ is the position-bias of the reset trigger position on the second direction.

14. The position-bias compensation device according to claim 13, wherein the 3D image is composed by the first image and the second image which has an aberration to the first image, and is visible by the user wearing three-dimensional glasses.

15. The position-bias compensation device according to claim 13, wherein the compensation unit resets a three-dimensional image coordinate according to the bias, and the three-dimensional image coordinate is configured for displaying the three-dimensional image.

* * * * *